US011264625B2

(12) United States Patent
Patel et al.

(10) Patent No.: US 11,264,625 B2
(45) Date of Patent: Mar. 1, 2022

(54) TWO-PHASE WATER COOLING IN AN ELECTROCHEMICAL HYDROGEN SEPARATOR

(71) Applicant: FuelCell Energy, Inc., Danbury, CT (US)

(72) Inventors: Pinakin Patel, Danbury, CT (US); Jonathan Malwitz, Danbury, CT (US); Ray Kopp, New Fairfield, CT (US); Ludwig Lipp, Brookfield, CT (US); Jesse Roy, Danbury, CT (US)

(73) Assignee: FuelCell Energy, Inc., Danbury, CT (US)

( * ) Notice: Subject to any disclaimer, the term of this patent is extended or adjusted under 35 U.S.C. 154(b) by 280 days.

(21) Appl. No.: 16/565,169

(22) Filed: Sep. 9, 2019

(65) Prior Publication Data

US 2020/0083546 A1   Mar. 12, 2020

Related U.S. Application Data

(60) Provisional application No. 62/730,331, filed on Sep. 12, 2018.

(51) Int. Cl.
*H01M 8/04029*  (2016.01)
*B01D 19/00*  (2006.01)
*H01M 8/04007*  (2016.01)
*H01M 8/026*  (2016.01)

(52) U.S. Cl.
CPC .... *H01M 8/04029* (2013.01); *B01D 19/0063* (2013.01); *H01M 8/026* (2013.01); *H01M 8/04059* (2013.01); *H01M 8/04074* (2013.01)

(58) Field of Classification Search
CPC .. H01M 8/026; H01M 8/0263; H01M 8/0267; H01M 8/04029; H01M 8/04059; H01M 8/04074; F28D 2021/0043; B01D 19/0063; Y02E 60/50
See application file for complete search history.

(56) References Cited

U.S. PATENT DOCUMENTS

| 3,781,041 | A | * | 12/1973 | Petzetakis | F16L 17/035 285/111 |
|---|---|---|---|---|---|
| 3,923,546 | A | | 12/1975 | Katz et al. | |
| 3,964,929 | A | | 6/1976 | Grevstad | |
| 3,964,930 | A | * | 6/1976 | Reiser | H01M 8/08 429/435 |
| 6,050,331 | A | | 4/2000 | Breault et al. | |
| 7,150,927 | B2 | | 12/2006 | Hickey et al. | |
| 7,150,929 | B2 | | 12/2006 | Fredley et al. | |
| 7,201,979 | B2 | | 4/2007 | Mcelroy et al. | |

(Continued)

FOREIGN PATENT DOCUMENTS

| EP | 1 620 906 | | 2/2006 |
|---|---|---|---|
| EP | 1 665 441 | | 6/2006 |
| WO | WO 2007-086827 | * | 8/2007 |

*Primary Examiner* — Brittany L Raymond
(74) *Attorney, Agent, or Firm* — Foley & Lardner LLP

(57) ABSTRACT

A cooling plate assembly includes an anode half-plate having an anode upper surface and an opposing anode lower surface, and a cathode half-plate having a cathode upper surface and an opposing cathode lower surface, the cathode lower surface configured to engage the anode upper surface. The assembly further includes a cooling tube disposed between and engaging the anode upper surface and the cathode lower surface.

18 Claims, 6 Drawing Sheets

(56) References Cited

U.S. PATENT DOCUMENTS

| | | |
|---|---|---|
| 7,364,810 B2 | 4/2008 | Sridhar et al. |
| 7,422,810 B2 | 9/2008 | Venkataraman et al. |
| 7,482,078 B2 | 1/2009 | Sridhar et al. |
| 7,575,822 B2 | 8/2009 | Mitlitsky et al. |
| 7,704,618 B2 | 4/2010 | Venkataraman et al. |
| 7,781,112 B2 | 8/2010 | Sridhar et al. |
| 7,833,668 B2 | 11/2010 | Ballantine et al. |
| 7,846,599 B2 | 12/2010 | Ballantine et al. |
| 7,878,280 B2 | 2/2011 | Sridhar et al. |
| 7,887,971 B2 | 2/2011 | Hickey et al. |
| 7,901,814 B2 | 3/2011 | Venkataraman et al. |
| 8,053,136 B2 | 11/2011 | Hickey et al. |
| 8,071,246 B2 | 12/2011 | Mitlitsky et al. |
| 8,277,992 B2 | 10/2012 | Mitlitsky et al. |
| 8,435,689 B2 | 5/2013 | Venkataraman et al. |
| 8,663,859 B2 | 3/2014 | Mitlitsky et al. |
| 8,852,820 B2 | 10/2014 | Perry et al. |
| 9,190,693 B2 | 11/2015 | Sridhar et al. |
| 9,413,017 B2 | 8/2016 | Bandhauer et al. |
| 9,722,273 B2 | 8/2017 | Perry et al. |
| 9,911,989 B2 | 3/2018 | Mcelroy et al. |
| 9,947,955 B2 | 4/2018 | Sridhar et al. |
| 10,096,840 B1 | 10/2018 | Venkataraman et al. |
| 10,361,442 B2 | 7/2019 | Perry et al. |
| 10,581,090 B2 | 3/2020 | Ballantine et al. |
| 2010/0119885 A1* | 5/2010 | Jayne .................. H01M 8/0668 429/434 |
| 2010/0266923 A1 | 10/2010 | Mcelroy et al. |
| 2011/0189567 A1 | 8/2011 | Venkataraman et al. |
| 2017/0149071 A1* | 5/2017 | Dickson .............. H01M 8/0213 |
| 2020/0161671 A1 | 5/2020 | Ballantine et al. |

\* cited by examiner

TWO-PHASE WATER COOLING IN AN ELECTROCHEMICAL HYDROGEN SEPARATOR

CROSS-REFERENCE TO RELATED PATENT APPLICATION

The present application claims the benefit of and priority to U.S. Provisional Application No. 62/730,331, filed Sep. 12, 2018, the entire disclosure of which is hereby incorporated by reference herein.

BACKGROUND

The present application relates generally to the field of fuel cell cooling systems. More specifically, the present application relates to two-phase water cooling for use with electrochemical hydrogen separation systems.

A fuel cell stack may be operated in reverse by applying a current to the fuel cell stack to electrochemically separate gases. For example, a fuel cell stack may be operated as an Electrochemical Hydrogen Separator ("EHS") to separate hydrogen from anode or cathode feed gas streams. The life expectancy of an EHS is inversely related to its operating temperature. For example, as the operating temperature increases, degradation of the EHS increases, shortening the life expectancy. A cooling system may be used to control the operating temperature.

Conventional cooling for fuel cell stacks may include recirculating oil through the stack to draw heat away from the stack. An oil recirculation system requires a large pump to handle high volumetric flow and the system has a long startup procedure for heating the oil because the viscosity of non-heated oil is too high to pump effectively. Further, oil leaks in the stack may lead to catastrophic damage to the system. Another example of a cooling system includes the circulation of water rather than oil. These cooling systems generally include water being recirculated in a single phase (e.g., liquid), rather than between phases (e.g., between liquid and gas). The single-phase configuration limits the amount of heat that may be transferred in the cooling system because excess heat is not transferred to vaporize water into steam or superheat the steam.

Other conventional cooling systems may include inserting separator plates between fuel cells in the stack and running a coolant through the separator plates. However, these separator plates increase the cost and complexity of the fuel cell system by requiring additional components in a fuel cell stack. Further, because the coolant runs through the separator plate rather than through a cooling tube directly engaging the fuel cell, the rate of heat transfer between the fuel cell and the coolant is limited based on the heat transfer properties of the material forming the separator plate.

It would be advantageous to provide an improved system for cooling fuel cells in an EHS.

SUMMARY

One embodiment relates to a cooling plate assembly. The cooling plate assembly includes an anode half-plate having an anode upper surface and an opposing anode lower surface. The cooling plate assembly further includes a cathode half-plate having a cathode upper surface and an opposing cathode lower surface, the cathode lower surface configured to engage the anode upper surface. The assembly further includes a cooling tube disposed between and engaging the anode upper surface and the cathode lower surface.

One aspect of the assembly relates to the cooling tube being configured to pass a cooling fluid therethrough, and the cooling fluid including water, steam, or a two-phase mixture of water and steam.

Another aspect of the assembly relates to the cooling tube being configured to transfer heat from at least one of the anode half-plate or the cathode half-plate to the cooling fluid in the cooling tube.

Another aspect of the assembly relates to an anode cooling channel formed in the anode upper surface and configured to receive at least a portion of the cooling tube in the anode cooling channel, and a cathode cooling channel formed in the cathode lower surface and configured to receive at least a portion of the cooling tube in the cathode cooling channel.

Another aspect of the assembly relates to at least one of the anode half-plate or the cathode half-plate including an anode outlet configured to pass anode exhaust gas therethrough. The cooling tube further comprises an inlet end configured to receive the cooling fluid and an elongate first portion proximate the inlet end. The first portion of the cooling tube is configured to be disposed proximate the anode outlet.

Another aspect of the assembly relates to the cooling tube including an inlet end, an outlet end, and a plurality of passes forming a serpentine pattern therebetween. The anode cooling channel includes an inlet end, an outlet end, and a plurality of passes therebetween forming a complementary profile to the cooling tube. The cathode cooling channel comprises an inlet end, an outlet end, and a plurality of passes therebetween forming a complementary profile to the cooling tube.

Another aspect of the assembly relates to a thermally-conductive coating disposed on at least one of the anode cooling channel or the cathode cooling channel.

Another aspect of the assembly relates to a dielectric coating disposed between the cooling tube and each of the anode half-plate and the cathode half-plate.

Another embodiment relates to a fuel cell assembly. The fuel cell assembly includes a first fuel cell having an anode and a cathode, the anode defining an anode upper surface. The anode upper surface defines an anode cooling channel therein. The fuel cell assembly further includes a second fuel cell having an anode and a cathode, the cathode defining a cathode lower surface. The cathode lower surface defines a cathode cooling channel therein and the cathode lower surface is disposed on the anode upper surface. The fuel cell assembly further includes a cooling tube disposed in the anode cooling channel and the cathode cooling channel, the cooling tube defining an inlet end and an outlet end.

One aspect of the assembly relates to a cooling system, the cooling system having a cooling supply line configured to supply a cooling fluid to the inlet end of the cooling tube, and a cooling return line configured to receive the cooling fluid from the outlet end of the cooling tube. At the inlet end of the cooling tube, the cooling fluid includes water or a two-phase mixture of water and steam At the outlet end of the cooling tube, the cooling fluid includes steam or a two-phase mixture of water and steam.

Another aspect of the assembly relates to the cooling system further including a liquid-vapor separator having a water supply line configured to supply water to the liquid-vapor separator, and a vent configured to output steam from the liquid-vapor separator. The liquid-vapor separator is configured to supply water or the two-phase mixture to the cooling supply line, and the liquid-vapor separator is configured to receive steam or the two-phase mixture from the cooling return line.

Another aspect of the assembly relates to a dielectric coupling between the cooling tube and one of the cooling supply line or the cooling return line, the coupling having a core formed from a dielectric material, and a bore extending through the core and defining a first portion, a second portion, and a third portion disposed between the first portion and the second portion. The first portion is configured to receive one of the inlet end or the outlet end of the cooling tube, and the second portion is configured to receive one of the cooling supply line or the cooling return line.

Another aspect of the assembly relates to the third portion being disposed between the cooling tube and the one of the cooling supply line or the cooling return line, and the third portion being configured to prevent the cooling tube from directly engaging the cooling supply line or the cooling return line.

Another aspect of the assembly relates to a shell being disposed annularly about the core.

Another aspect of the assembly relates to an epoxy filler is disposed between the shell and the core.

Another embodiment relates to a method of cooling a fuel cell assembly. The method includes providing an anode half-plate defining an anode cooling channel and a cathode half-plate defining a cathode cooling channel. The method further includes providing a cooling tube disposed in the anode cooling channel and the cathode cooling channel. The method further includes receiving a two-phase mixture of water and steam at an inlet end of the cooling tube and transferring heat from at least one of the anode half-plate or the cathode half-plate to the water in the cooling tube. The method further includes vaporizing at least a portion of the water in the two-phase mixture into steam and outputting steam or the two-phase mixture from the cooling tube.

One aspect of the method relates to the anode half-plate being configured to transfer heat directly to the cooling tube through the anode cooling channel, and the cathode half-plate being configured to transfer heat directly to the cooling tube through the cathode cooling channel.

Another aspect of the method relates to feeding the two-phase mixture to the cooling tube proximate an anode exhaust stream.

Another aspect of the method relates to providing a liquid-vapor separator, providing liquid water to the liquid-vapor separator, and pressurizing the water in the liquid-vapor separator to form the two-phase mixture received at the cooling tube.

Another aspect of the method relates to controlling pressure in the liquid-vapor separator with a backpressure release valve configured to vent steam from the liquid-vapor separator.

DETAILED DESCRIPTION

Figure 1:
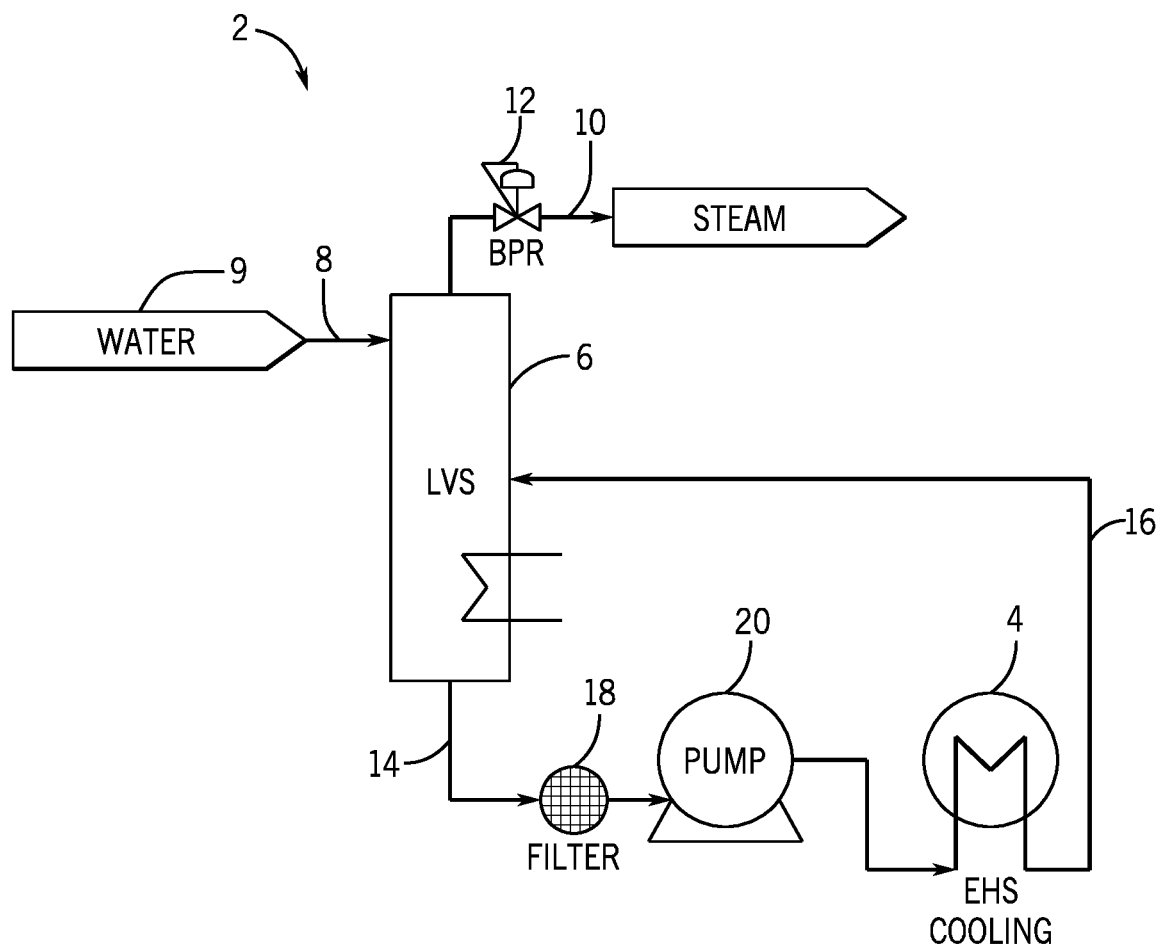
FIG. 1 is a schematic view of a cooling system according to an exemplary embodiment.

Referring to the FIGURES generally, a fuel cell system with two-phase water cooling is shown according to various exemplary embodiments. Referring to FIG. 1, a cooling system 2 is shown according to an exemplary embodiment. The cooling system 2 includes an Electrochemical Hydrogen Separator ("EHS") 4, which is a fuel cell stack including a plurality of fuel cells stacked in series. Each fuel cell includes an anode and a cathode with an electrolyte (e.g., phosphoric acid, etc.) matrix disposed therebetween. While FIG. 1 shows an EHS 4, according to other exemplary embodiments, the cooling system 2 may include an Electrochemical Hydrogen Compressor ("EHC") instead of or in addition to the EHS 4.

The cooling system 2 further includes a liquid-vapor separator ("LVS") 6 (e.g., knockout pot, reservoir, etc.), which is configured to contain liquid water and/or steam for cooling the EHS 4 and to separately output each of the water and the steam. The LVS 6 includes a water supply line 8 for providing water from a water source 9 to the LVS 6 for startup of the cooling system 2 or for providing make-up water to the LVS 6 when an amount of liquid water in the LVS 6 is below a desired level for operation of the cooling system 2. The LVS 6 further includes a steam outlet line 10 for releasing excess steam from the LVS 6. The steam outlet line 10 includes a backpressure release valve 12 or other valve for controlling the flow of steam from the LVS 6. For example, the valve 12 may be configured to prevent pressure from building up in the LVS 6 above a desired threshold pressure, regardless of the rate that steam is routed (i.e., fed) to other parts of the fuel cell system.

Steam released or output from the LVS 6 may be used elsewhere in a fuel cell system or for operation of the EHS 4. For example, steam may be output from the steam outlet line 10 and mixed with anode and/or cathode fuel for humidifying (e.g., saturating) the fuel for use in the fuel cell system. Steam mixed with the fuel may yield a steam-to-carbon ratio of approximately 1.6, reducing the external saturation requirements to achieve a steam-to-carbon ratio of approximately 2.0 for the fuel for operation of the EHS 4 or another fuel cell. In contrast, in a conventional fuel cell system without an LVS, an external saturator is required to generate all of the steam for mixing with fuel to achieve the desired steam-to-carbon ratio. Without a source of recycled steam, the saturator must provide all of the heat to vaporize water into steam rather than recycling heat from other portions of the fuel cell system, increasing the operating costs of the system. However, in the cooling system 2, the LVS 6 advantageously humidifies the fuel with at least approximately 80% of the desired steam. To the extent that a saturator is needed to achieve the desired steam-to-carbon ratio, it only needs to make up for the remaining 20% of the desired steam. By reducing the required saturator output, a less expensive saturator with a smaller output may be used, thereby reducing the total cost of the cooling system. Alternatively, the saturator may operate below its maximum capacity for steam generation, reducing thermal stress and wear on the saturator, and thereby extending the operational life of both the saturator and the system. According to another exemplary embodiment, where the LVS 6 generates more steam than is required for humidifying the fuel, at least a portion of the steam may be vented from the fuel cell system.

The cooling system 2 further includes a cooling supply line 14 upstream from the EHS 4 and a cooling return line 16 downstream from the EHS 4. The cooling supply line 14 is configured to feed (e.g., transfer, pass, supply, etc.) a cooling fluid from the LVS 6 to the EHS 4. According to an exemplary embodiment, the cooling fluid fed to the EHS 4 is either liquid water or a two-phase mixture of water and steam. The cooling return line 16 is configured to feed (e.g., transfer, pass, supply, etc.) the cooling fluid output from the EHS 4 back to the LVS 6. According to an exemplary embodiment, the cooling fluid output from the EHS 4 is either steam or a two-phase mixture of water and steam. While passing through the EHS 4, heat energy is transferred from the EHS 4 to the cooling fluid, such that at least a portion of the water in the cooling fluid is vaporized into steam. In this configuration, the cooling fluid output from the EHS 4 has a higher proportion of steam to water than when the cooling fluid is first received at the EHS 4.

As shown in FIG. 1, a filter 18 is positioned along the cooling supply line 14 for removing impurities from the cooling fluid in the LVS 6 (e.g., in the make-up water). For example, the water supply 9 may supply tap water to the LVS 6, which may need to be filtered and/or de-ionized to provide purified steam to a fuel cell since some fuel cells may be sensitive to the presence of impurities. Further, these impurities may build-up on various components in a fuel cell system over time and reduce the operational performance of the system. Still referring to FIG. 1, a pump 20 is positioned along the cooling supply line 14 for moving (e.g., pumping, etc.) water through the cooling system 2 and into the EHS 4. While FIG. 1 shows both the filter 18 and the pump 20 disposed along the cooling supply line 14 upstream from the EHS 4, according to other exemplary embodiments, the filter 18 and/or the pump 20 may be positioned at other locations of the cooling system 2 (e.g., downstream from the EHS 4 along the cooling return line 16, etc.).

During operation of the cooling system 2, the water pressure and/or flow rate of the cooling fluid may be controlled along the cooling supply line 14 and the cooling return line 16 to enable partial vaporization of liquid water in the cooling fluid as the liquid water draws heat from the EHS 4. For example, the water pressure may be controlled by the valve 12 (e.g., opening the valve 12 to decrease pressure in the cooling system 2) and the flow rate may be controlled by the pump 20. The water pressure and flow rate in the cooling system 2 may be set, such that vaporization is maintained between approximately 5% and 50% within the EHS 4. The increased pressure in the LVS 6 may condense the cooling fluid output from the EHS 4, such that steam in the cooling fluid is compressed back into liquid water for reintroduction to the EHS 4 through the cooling supply line 14.

The cooling system 2 may further accelerate the EHS start-up process by, for example, recirculating the cooling fluid from the LVS 6 through the EHS 4 to bring the water to a sufficiently high temperature to operate the EHS 4.

Figure 2:
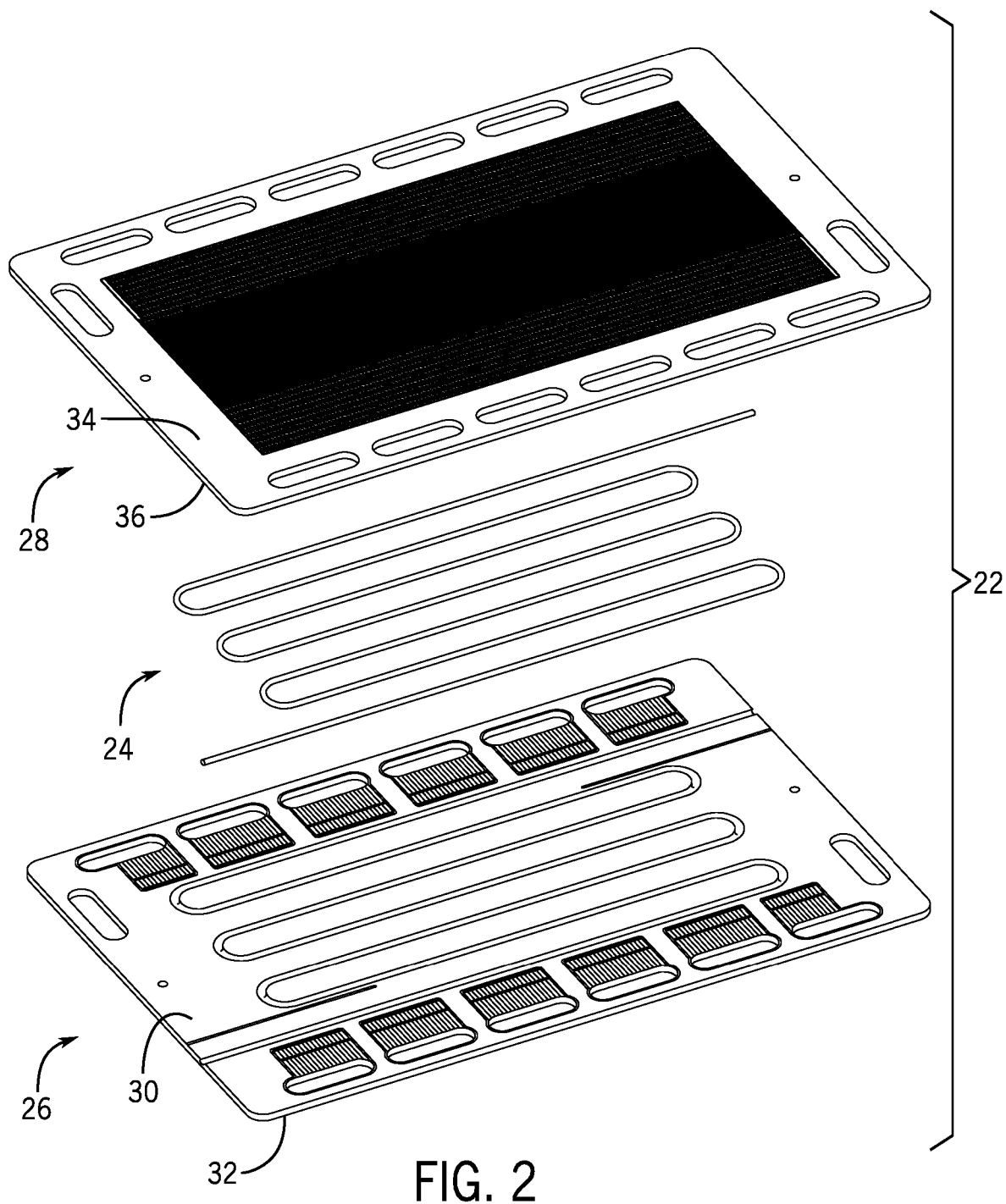
FIG. 2 is an exploded, perspective view of a cooling plate assembly according to an exemplary embodiment.

Referring now to FIGS. 2-5, a portion of the EHS 4 is shown according to an exemplary embodiment. Specifically, the EHS 4 includes a plurality of fuel cells and each fuel cell may be formed from separate anode and cathode half-plates 26, 28, respectively. FIG. 2 shows a cooling plate assembly 22, including a cathode half-plate 28 for a first fuel cell disposed on an anode half-plate 26 for a second adjacent fuel cell when connecting the fuel cells in the EHS 4 in series. It should be noted that for clarity, FIG. 2 does not show an anode half-plate 26 for the first fuel cell or the cathode half-plate 28 for the second fuel cell. As shown in FIG. 2, the cooling plate assembly 22 includes a cooling tube 24 (for routing the cooling fluid from the cooling supply line 14 to the cooling return line 16) disposed between an anode half-plate 26 and a cathode half-plate 28, which will be described in further detail below.

Referring now to FIG. 2, the cooling plate assembly 22 is shown according to an exemplary embodiment with the anode half-plate 26 defining an anode upper surface 30 facing the cathode half-plate 28 and an opposing anode lower surface 32. Similarly, the cathode half-plate 28 defines a cathode upper surface 34 and an opposing cathode lower surface 36 facing the anode half-plate 26. When the first and second fuel cells are assembled in the EHS 4, the cathode lower surface 36 engages (e.g., is disposed on) the anode upper surface 30. In this configuration, the cooling tube 24 is configured to directly engage one or both of the anode upper surface 30 and the cathode lower surface 36 (e.g., without a separate intervening cooling plate disposed between the anode and cathode half-plates 26, 28). This configuration reduces the overall size, complexity, and material cost of the cooling plate assembly 22. Further, without an intervening cooling plate between the cooling tube 24 and the anode and cathode half-plates 26, 28, heat may be transferred more efficiently and completely to the cooling tube 24 because the heat does not have to overcome impedance of the material that would otherwise form the intervening cooling plate.

In the EHS 4, a cooling tube 24 may be disposed between each fuel cell or placed at intervals between fuel cells. For example, the EHS 4 may include a plurality of cooling tubes 24 spaced apart by between four and ten fuel cells. The spacing of the cooling tubes 24 may be determined based on a desired heat transfer, expected operating temperature of the EHS 4, or other metrics. Fuel cells without a cooling tube 24 disposed therebetween may include a channel structure described below (e.g., to simplify manufacturing) or may be conventional fuel cells without such a structure.

Figure 3:
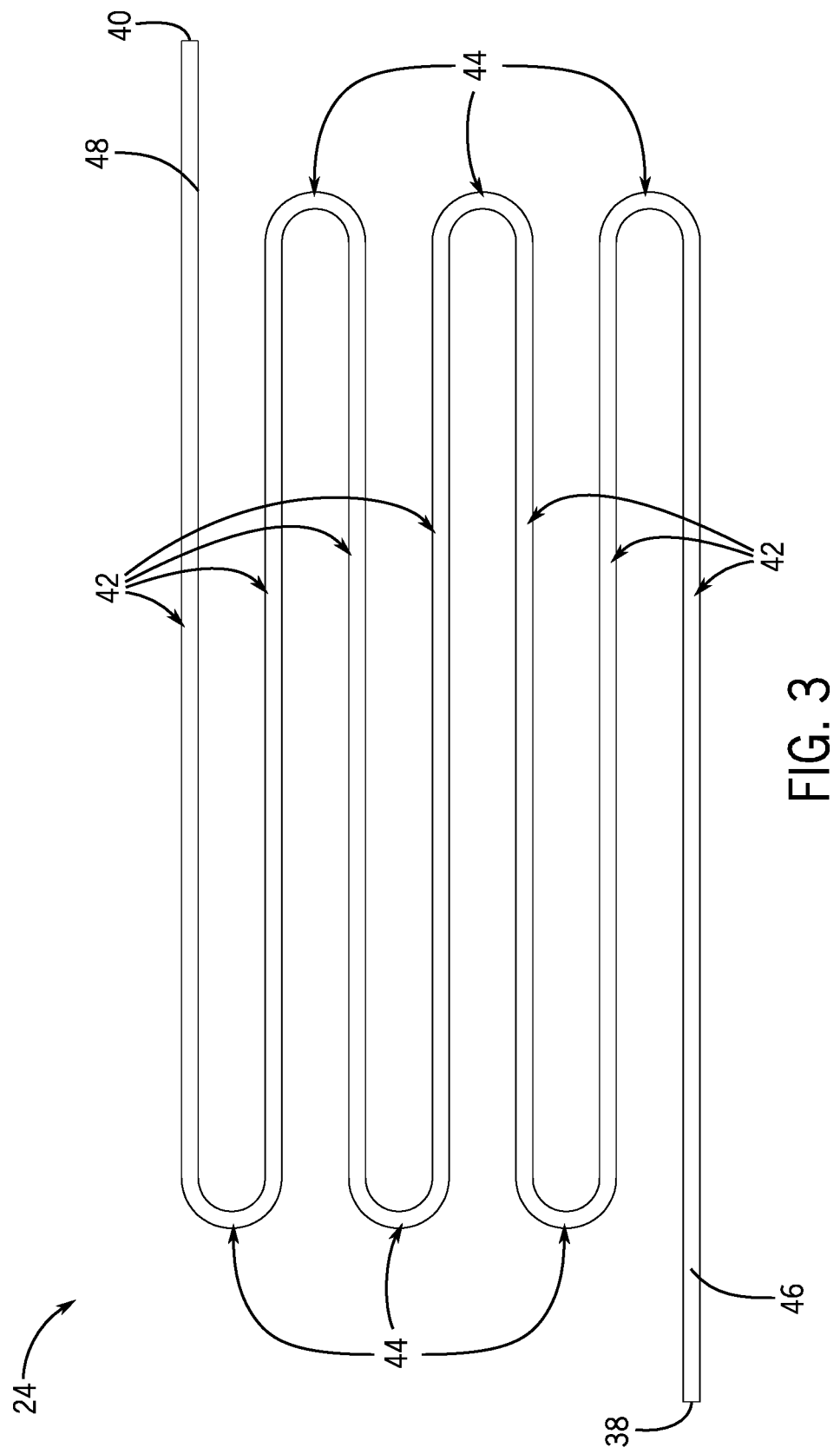
FIG. 3 is a top view of a cooling tube according to an exemplary embodiment.

Referring now to FIG. 3, the cooling tube 24 is shown according to an exemplary embodiment. The cooling tube 24 defines a generally serpentine pattern having an inlet end 38 (e.g., first end) and an outlet end 40 (e.g., second end). The inlet end 38 is configured to receive the cooling fluid (e.g., liquid water or a two-phase mixture of water and steam) from the cooling supply line 14 and the outlet end 40 is configured to output the cooling fluid (e.g., steam or a two-phase mixture of water and steam) to the cooling return line 16. The cooling tube 24 includes a plurality of elongate passes 42 fluidly connecting the inlet end 38 and the outlet end 40. A curved end section 44 is formed between adjacent passes 42 to redirect the flow of water and steam in the cooling tube 24. FIG. 3 shows the passes 42 being generally parallel, although the passes 42 may have other orientations. The passes 42 proximate the inlet end 38 define an inlet pass 46 (e.g. first pass) and is generally linear (e.g., elongate) between the inlet end 38 of the cooling tube 24 and the corresponding end section 44 at an opposing end of the inlet pass 46. Similarly, the pass 42 proximate the outlet end 40 defines an outlet pass 48 (e.g., second pass) and is generally linear (e.g., elongate) between the outlet end 40 of the cooling tube 24 and the corresponding end section 44 at an opposing end of the outlet pass 48.

Figure 4:
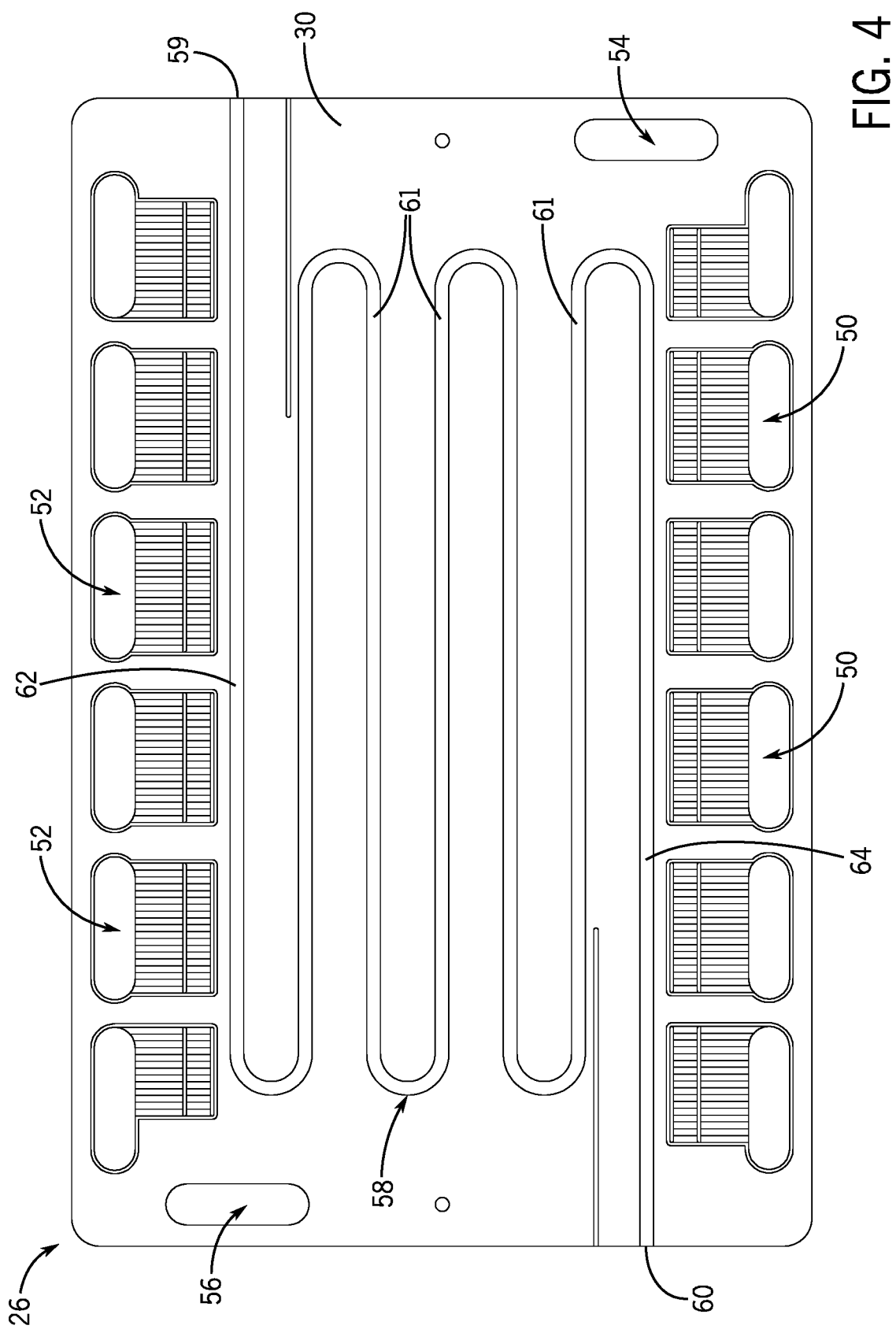
FIG. 4 is top view of an anode half-plate according to an exemplary embodiment.

Referring now to FIG. 4, the anode upper surface 30 of the anode half-plate 26 is shown according to an exemplary embodiment. A plurality of anode inlets 50 and anode outlets 52 extend through the anode half-plate 26 proximate to and within (e.g., internal to, etc.) an outer periphery of the anode half-plate 26. The anode inlets 50 are configured to receive an anode inlet gas stream passing therethrough and the anode outlets 52 are configured to receive an anode gas outlet stream passing therethrough. At least a portion of the anode gas outlet stream is formed from anode exhaust from the anode half-plate 26 after reaction with a cathode gas stream. The anode inlets 50 and anode outlets 52 may be formed proximate to opposing edges of the anode half-plate 26.

The anode half-plate 26 may further include a cathode inlet 54 and a cathode outlet 56 extending through the anode half-plate 26 and within (e.g., internal to, etc.) the outer periphery of the anode half-plate 26. The cathode inlet 54 is configured to receive a cathode inlet gas stream passing therethrough and the cathode outlet 56 is configured to receive a cathode outlet gas stream passing therethrough. At least a portion of the cathode gas outlet stream is formed from cathode exhaust from the cathode half-plate 28 in the same or an adjacent fuel cell, which is discussed in further detail below. The cathode inlet 54 and the cathode outlet 56 may be formed proximate to opposing edges of the anode half-plate 26.

The anode upper surface 30 further defines an anode cooling channel 58 formed therein. The anode cooling channel 58 defines a shape complementary to (e.g., substantially the same as, etc.) that of the cooling tube 24 and is configured to receive at least a portion of the cooling tube 24 directly therein. For example, as shown in FIG. 4, the anode cooling channel 58 defines a generally serpentine pattern having an inlet end 59 (e.g., first end) and an outlet end 60 (e.g., second end). The anode cooling channel 58 includes a plurality of elongate passes 61 corresponding to (e.g., having a complementary profile to, etc.) the passes 48 of the cooling tube 24. The pass 61 proximate the anode outlets 52 and/or the cathode outlet 56 defines a first portion 62 of the anode cooling channel 58 and is configured to receive the inlet pass 46 of the cooling tube 24. The first portion 62 extends proximate the inlet end 59 of the anode cooling channel 58. The pass 61 proximate the anode inlets 50 and/or the cathode inlet 54 defines a second portion 64 of the anode cooling channel 58 and is configured to receive the outlet pass 48 of the cooling tube 24. The second portion 64 extends proximate the outlet end 60 of the anode cooling channel 58.

Temperatures in the anode half-plate 26 may be highest around the first portion 62 of the anode cooling channel 58 due to the anode exhaust flowing through the anode outlets 52 and across the anode upper surface 30 proximate the anode outlets 52 as well as cathode exhaust flowing through the cathode outlets 56. In order to maximize the transfer of heat from the anode half-plate 26 around the first portion 62 of the anode cooling channel 58 to the cooling fluid in the cooling tube 24, the cooling fluid first passes by the hotter first portion 62 before following the serpentine pattern to the cooler second portion 64. As heat is transferred from the anode half-plate 26 to the cooling fluid in the cooling tube 24, the water forming part of the cooling fluid is vaporized into steam, increasing the proportion of steam in the cooling tube 24 and converting (i.e., transforming) the cooling fluid to a two-phase mixture of water and steam in the cooling tube 24 moving downstream toward the cooling return line 16. If enough heat is transferred from the anode half-plate 26 to the cooling fluid in the cooling tube 24, the cooling tube 24 may output the cooling fluid as pure steam without any water.

Figure 5:
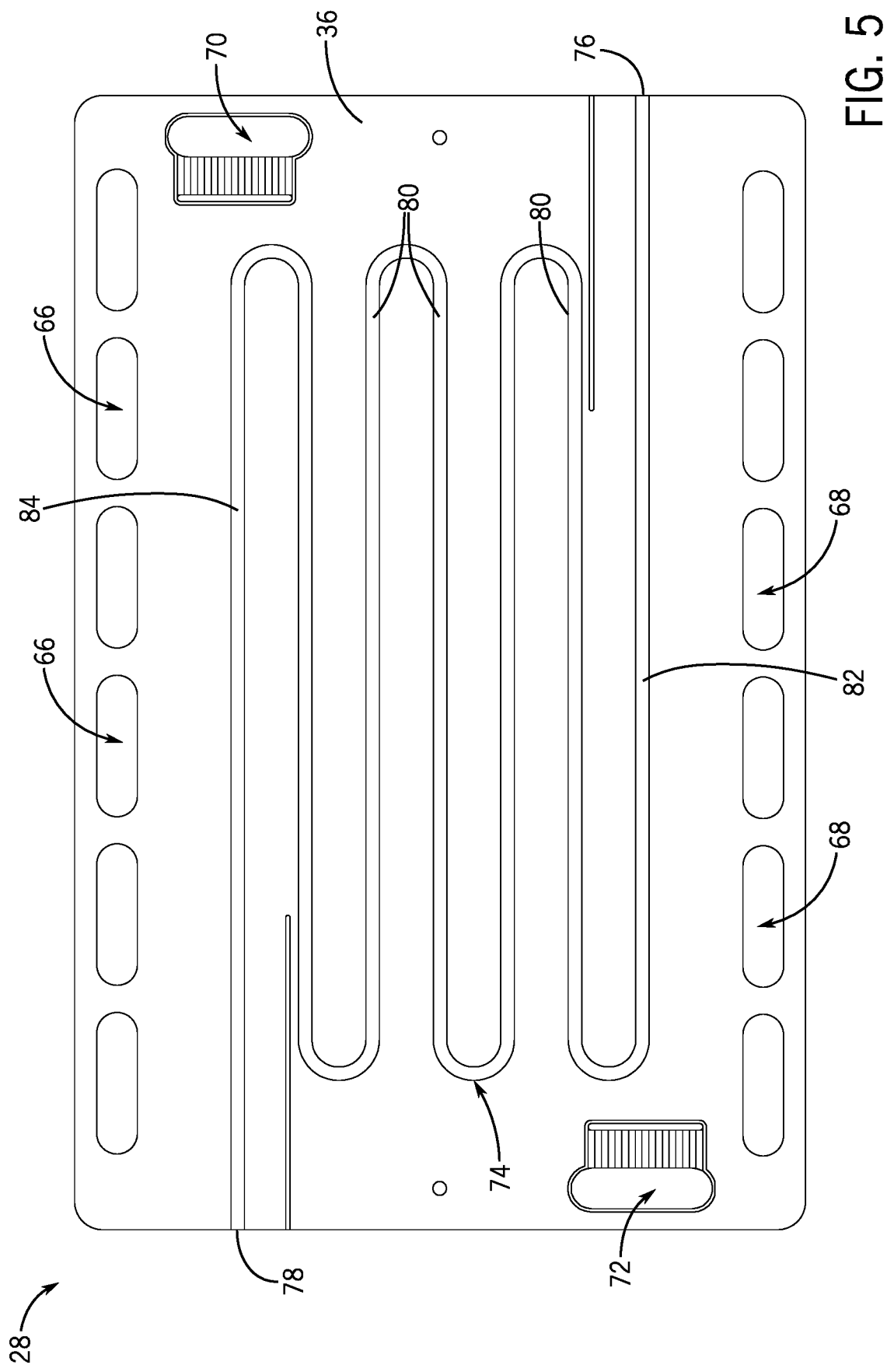
FIG. 5 is a bottom view of a cathode half-plate according to an exemplary embodiment.

Referring now to FIG. 5, the cathode lower surface 36 of the cathode half-plate 28 is shown according to an exemplary embodiment. A plurality of anode inlets 66 and anode outlets 68 extend through the cathode half-plate 28 proximate to and within (e.g., internal to, etc.) an outer periphery of the cathode half-plate 28. The anode inlets 66 are configured to receive the anode inlet gas stream passing therethrough and the anode outlets 68 are configured to receive the anode gas outlet stream passing therethrough. At least a portion of the anode gas outlet stream is formed from anode exhaust from the anode half-plate 26 in the same or an adjacent fuel cell after reaction with a cathode gas stream. The anode inlets 66 and anode outlets 68 may be formed proximate to opposing edges of the cathode half-plate 28.

The cathode half-plate 28 may further include a cathode inlet 70 and a cathode outlet 72 extending through the cathode half-plate 28 and within (e.g., internal to, etc.) the outer periphery of the cathode half-plate 28. The cathode inlet 70 is configured to receive the cathode inlet gas stream passing therethrough and the cathode outlet 72 is configured to receive the cathode outlet gas stream passing therethrough. At least a portion of the cathode gas outlet stream is formed from cathode exhaust from the cathode half-plate 28. The cathode inlet 70 and the cathode outlet 72 may be formed proximate to opposing edges of the cathode half-plate 28.

The cathode lower surface 36 further defines a cathode cooling channel 74 formed therein. The cathode cooling channel 74 defines a shape complementary to (e.g., substantially the same as, etc.) that of the cooling tube 24 and the anode cooling channel 58 and is configured to receive at least a portion of the cooling tube 24 directly therein. For example, as shown in FIG. 5, the cathode cooling channel 74 defines a generally serpentine pattern having an inlet end 76 (e.g., first end) and an outlet end 78 (e.g., second end). The cathode cooling channel 74 includes a plurality of elongate passes 80 corresponding to (e.g., having a complementary profile to, etc.) the passes 48 of the cooling tube 24 and the passes 61 of the anode cooling channel 58. The pass 80 proximate the anode outlets 68 and/or the cathode outlet 72 defines a first portion 82 of the cathode cooling channel 74 and is configured to receive the inlet pass 46 of the cooling tube 24. The first portion 82 extends proximate the inlet end 76 of the cathode cooling channel 74. The pass 80 proximate the anode inlets 66 and/or the cathode inlet 70 defines a second portion 84 of the cathode cooling channel 74 and is configured to receive the outlet pass 48 of the cooling tube 24. The second portion 84 extends proximate the outlet end 78 of the cathode cooling channel 74.

Similarly as discussed with respect to the anode half-plate 26, temperatures in the cathode half-plate 28 may be highest around the first portion 82 of the cathode cooling channel 74 due to the anode exhaust flowing through the anode outlets 68 as well as cathode exhaust flowing through the cathode outlet 72 and across the cathode lower surface 36. In order to maximize the transfer of heat from the cathode half-plate 28 around the first portion 82 of the cathode cooling channel 74 to the cooling fluid in the cooling tube 24, the cooling fluid first passes by the hotter first portion 82 before following the serpentine pattern to the cooler second portion 84. As heat is transferred from the cathode half-plate 28 to the cooling fluid in the cooling tube 24, the water in the cooling fluid is vaporized into steam, increasing the proportion of steam in the cooling tube 24 and converting (i.e., transforming) the cooling fluid to a two-phase mixture of water and steam in the cooling tube 24 moving downstream toward the cooling return line 16. If enough heat is transferred from the cathode half-plate 28 to the cooling fluid in the cooling tube 24, the cooling tube 24 may output cooling fluid as pure steam without any water.

Referring now to FIGS. 2-5, generally, the cooling plate assembly 22 may be formed according to various exemplary embodiments. The cooling tube 24 may be formed from stainless steel or other suitable material. Further, the cooling tube 24 may be coated with a thin layer of Teflon to protect the cooling tube 24 from phosphoric acid corrosion (e.g., from the electrolyte in the electrolyte matrix, etc.) as well as dielectric isolation from the anode half-plate 26 and the cathode half-plate 28, which are conductive. According to another exemplary embodiment, the anode cooling channel 58 and/or the cathode cooling channel 74 may be coated with a thin layer of a thermally conductive compound prior to insertion of the cooling tube 24 and bonding of the anode half-plate 26 to the cathode half-plate 28 in order to aid in heat transfer from the plates 26, 28 to the cooling tube 24. According to other exemplary embodiments, the cooling tube 24 and/or the channels 58, 74 may be coated with other dielectric coatings, such that a dielectric coating is disposed between the cooling tube 24 and the 58, 74, providing isolation from electrical charge passing therebetween.

The anode cooling channel 58 and the cathode cooling channel 74 may each have substantially semi-circular (e.g., half round, etc.) cross sections, such that when the lower cathode surface 36 is disposed on the anode upper surface 30, the anode cooling channel 58 and the cathode cooling channel 74 cooperate to form a substantially circular cross section. In this configuration, the cooling tube 24 may form a complementary, substantially circular cross section for being received in the channels 58, 74. According to other exemplary embodiments, the channels 58, 74 and the cooling tube 24 may form other complementary cross-sectional shapes. For example, the cooling tube 24 may be pre-pressed, such that it forms flat upper and lower surfaces with rounded (e.g., radius) corners. In this configuration, the channels 58, 74 may include flat portions, resulting in a reduction in the overall plate thickness for the cooling plate assembly 22 and the EHS 4, generally, because the channels 58, 74 do not need to be as deep in each of the half-plates 26, 28 to accommodate the cooling tube 24 therein. The channels 58, 74 may be machined or molded based on the desired cross-sectional profile. According to yet another exemplary embodiment, one of the anode half-plate 26 or the cathode half-plate 28 may fully receive the cooling tube 24 therein and the other of the anode half-plate 26 or the cathode half-plate 28 may be substantially flat (e.g., without a cooling channel). In this configuration, the cooling tube 24 is still configured to directly engage the flat surface formed without the corresponding cooling channel, even though the cooling tube 24 is inserted into only one of the anode or cathode half-plates 26, 28.

While FIG. 2 shows the cooling plate assembly 22 having a separate anode half-plate 26 and cathode half-plate 28, according to other exemplary embodiments, the anode half-plate 26 and the cathode half-plate 28 may be integrally formed as a single-piece plate with molded channels configured to receive the cooling tube 24. The cooling tube 24 may be positioned within the plate during formation of the plate, although according to other exemplary embodiments, the channels 58, 74 and cooling tube 24 may define other shapes, such that the cooling tube 24 may be inserted into the channels 58, 74 after the single-piece plate is formed. According to another exemplary embodiment, the anode half-plate 26 and the cathode half-plate 28 within a single fuel cell may be integrally formed.

It should be noted that electrical currents are generated in or flow through the EHS 4 and therefore may flow through the cooling tube 24. In a cooling system 2 in which the cooling supply line 14 and cooling return line 16 are formed from a material capable of carrying an electrical current and are directly coupled to the cooling tube 24, the current may inadvertently flow to other components in the cooling system 2 (e.g., the pump 20 or the LVS 6) and cause damage to or disrupt proper operation of these components. Accordingly, it would be advantageous to fluidly couple but electrically isolate the cooling supply line 14 and the cooling return line 16 to the cooling tube 24. For example, a dielectric coupling (i.e., an isolation component) may be disposed between the cooling supply line 14 and the inlet end 38 of the cooling tube 24 to electrically isolate the cooling supply line 14 from the EHS 4. Similarly, another dielectric coupling may be disposed between the cooling return line 16 and the outlet end 40 of the cooling tube 24.

Figure 6:
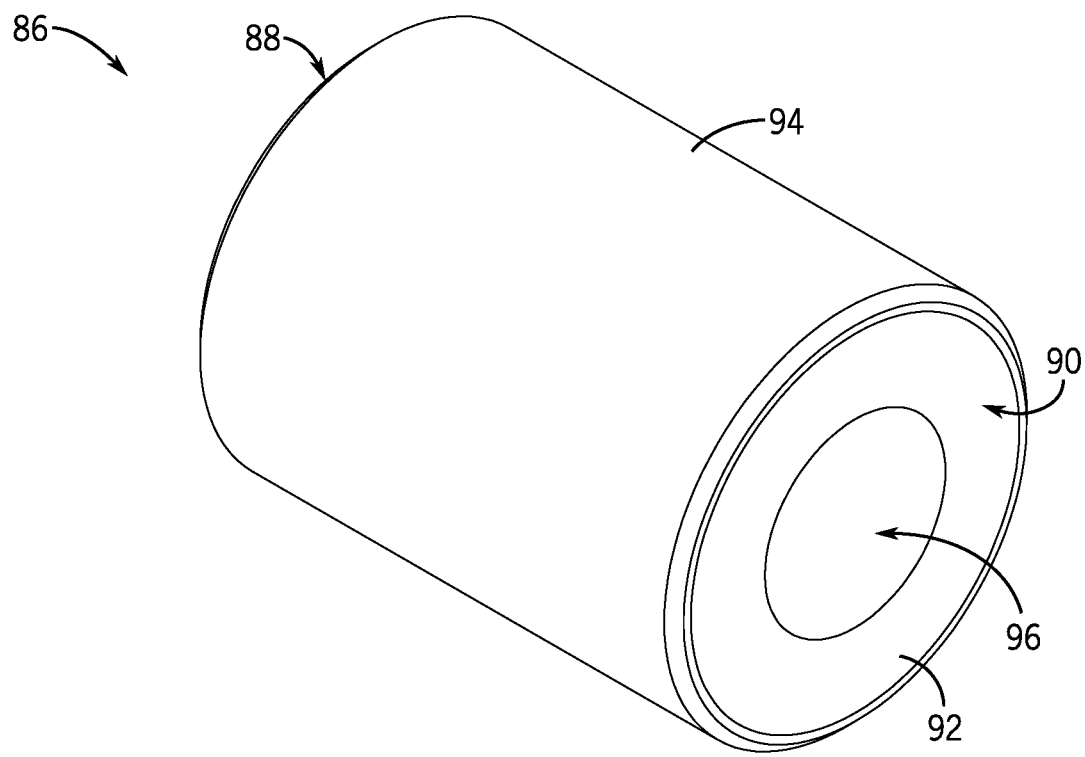
FIG. 6 is a perspective view of a dielectric coupling according to an exemplary embodiment.
Figure 7:
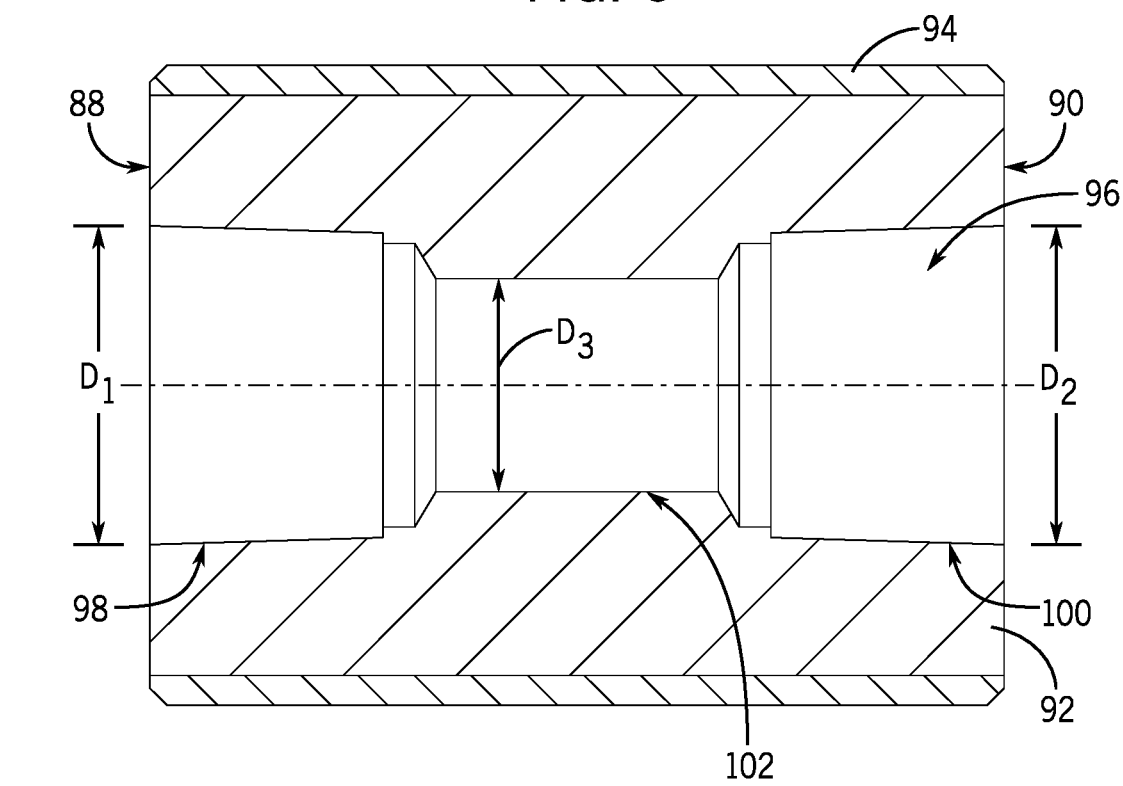
FIG. 7 is a cross-sectional view of the coupling of FIG. 6.

Referring now to FIGS. 6 and 7, a dielectric coupling 86 is shown according to an exemplary embodiment. The coupling 86 defines a first end 88 and a second end 90 and includes a dielectric core 92 and a shell 94 formed annularly about the core 92. The core 92 may be formed (e.g., machined, extruded, etc.) from a plastic tolerant of high temperatures during operation of the EHS 4 or other suitable dielectric materials. For example, the core 92 may be formed from polyetheretherketone ("PEEK"), which is a semi-crystalline engineered thermoplastic configured to withstand temperatures up to approximately 500° F. The shell 94 may be formed from stainless steel or other suitable metal and is configured to surround the core 92. In some configurations, an epoxy filler tolerant of high temperatures may be provided between the core 92 and the shell 94. While FIG. 6 shows the core 92 and the shell 94 having generally annular (e.g., cylindrical, etc.) shapes, according to other exemplary embodiments, the core 92 may define other shapes and the shell 94 may define a shape corresponding to an outer surface of the core 92.

Referring to FIG. 7, the coupling 86 defines a bore 96 extending from the first end 88 (e.g., inlet end, etc.) to the second end 90 (e.g., outlet end, etc.). The bore 96 includes a first portion 98 at the first end 88, a second portion 100 at the second end 90, and a third portion 102 extending therebetween. The first portion 98 defines a first diameter $D_1$ at the first end 88 of the coupling 86. The first diameter $D_1$ may be large enough to receive an end of the cooling supply line 14 or the cooling return line 16 therein. As shown in FIG. 7, the first portion 98 of the bore 96 may be tapered, such that a diameter of the bore 96 decreases moving into the first portion 98 away from the first end 88. In this configuration, the cooling supply line 14 or the cooling return line 16 may be press-fit in the first portion 98 of the coupling 86. For example, the first diameter $D_1$ may be substantially the same as or less than an outer diameter of the cooling supply line 14 or the cooling return line 16.

The second portion 100 defines a second diameter $D_2$ at the second end 90 of the coupling 86. The second diameter $D_2$ may be large enough to receive the inlet end 38 or the outlet end 40 of the cooling tube 24 therein. Similar to the first portion 98 of the bore 96, the second portion 100 of the bore 96 may be tapered, such that a diameter of the bore 96 decreases moving into the second portion 100 away from the second end 90. In this configuration, the cooling tube 24 may be press-fit in the second portion 100 of the coupling 86. For example, the second diameter $D_2$ may be substantially the same as or less than an outer diameter of the cooling tube 24.

As shown in FIGS. 4 and 5, the anode cooling channel 58 and the cathode cooling channel 74 do not increase in diameter at their inlet ends 59, 76 to receive the coupling 86 therein. Accordingly, in order to fluidly connect the coupling 86 to the cooling tube 24, the inlet end 38 of the cooling tube 24 may extend outward beyond an edge of the cooling plate assembly 22, such that the inlet end 38 is exposed outside the cooling plate assembly 22 and is configured to be received in the second portion 100 of the bore 96, external to the cooling plate assembly 22. Similarly, the anode cooling channel 58 and the cathode cooling channel 74 do not increase in diameter at their outlet ends 60, 78 to receive the coupling therein 86. Accordingly, the outlet end 40 of the cooling tube 24 may extend outward beyond an edge of the cooling plate assembly 22, such that the outlet end 40 is exposed outside the cooling plate assembly 22 and is configured to be received in the second portion 100 of the bore 96, external to the cooling plate assembly 22. According to another exemplary embodiment, the anode cooling channel 58 and the cathode cooling channel 74 may be sized to receive at least a portion of the coupling 86 therein, such that the cooling tube 24 is fluidly connected to the coupling 86 within the cooling plate assembly 22. In this configuration, even if the shell 94 is electrically conductive and engages the anode or cathode cooling channels 58, 74, the cooling supply line 14 and the cooling return line 16 are separated and electrically isolated from the shell 94, and therefore the anode and cathode cooling channels 58, 74 by the dielectric core 88.

Referring still to FIG. 7, the third portion 102 of the bore 96 defines a third diameter $D_3$ that is less than each of the first diameter $D_1$ and the second diameter $D_2$. Further, the third diameter $D_3$ is less than the diameter of each of the inlet end 38 and the outlet end 40 of the cooling tube 24 and the ends of the cooling supply line 14 and the cooling return line 16. In this configuration, when the cooling supply line 14 is inserted into the first portion 98 of the bore 96 and the inlet end 38 of the cooling tube 24 is inserted into the second portion 100 of the bore 96, the third portion 102 prevents the cooling supply line 14 from engaging the cooling tube 24. For example, the smaller third diameter $D_3$ ensures that at least a portion of the core 88 is disposed between the cooling supply line 14 and the cooling tube 24 and prevents the cooling supply line 14 from moving further toward the cooling tube 24. By separating the cooling tube 24 from the cooling supply line 14 with the core 92 formed from a dielectric material, electric charges are prevented from transferring from the EHS 4 to the cooling supply line 14.

Similarly, when the cooling return line 16 is inserted into the first portion 98 of the bore 96 and the outlet end 40 of the cooling tube 24 is inserted into the second portion 100 of the bore 96, the third portion 102 prevents the cooling return line 16 from engaging the cooling tube 24. For example, the smaller third diameter $D_3$ ensures that at least a portion of the core 88 is disposed between the cooling return line 16 and the cooling tube 24 and prevents the cooling return line 16 from moving further toward the cooling tube 24. By separating the cooling tube 24 from the cooling return line 16 with the core 88 formed from a dielectric material, electric charges are prevented from transferring from the EHS 4 to the cooling return line 16.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of this disclosure as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the position of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is to be understood that although the present invention has been described with regard to preferred embodiments thereof, various other embodiments and variants may occur to those skilled in the art, which are within the scope and spirit of the invention, and such other embodiments and variants are intended to be covered by corresponding claims. Those skilled in the art will readily appreciate that many modifications are possible (e.g., variations in sizes, structures, shapes and proportions of the various elements, values of parameters, mounting arrangements, use of materials, orientations, manufacturing processes, etc.) without materially departing from the novel teachings and advantages of the subject matter described herein. For example, the order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

What is claimed is:

1. A cooling plate assembly, comprising:
   an anode half-plate comprising an anode upper surface, an opposing anode lower surface, and a plurality of anode outlets configured to pass anode exhaust gas therethrough;
   a cathode half-plate comprising a cathode upper surface and an opposing cathode lower surface, the cathode lower surface configured to engage the anode upper surface; and
   a cooling tube disposed between and engaging the anode upper surface and the cathode lower surface;
   wherein the cooling tube comprises an inlet end, an outlet end, and a plurality of passes forming a serpentine pattern therebetween, a first pass of the plurality of passes being coupled to the inlet end; and wherein the first pass is the most proximate pass to each of the plurality of anode outlets.

2. The assembly of claim 1, wherein the cooling tube is configured to pass a cooling fluid therethrough; and
wherein the cooling fluid includes at least one of water, steam, or a two-phase mixture of water and steam.

3. The assembly of claim 2, wherein the cooling tube is configured to transfer heat from at least one of the anode half-plate or the cathode half-plate to the cooling fluid in the cooling tube.

4. The assembly of claim 2, further comprising:
an anode cooling channel formed in the anode upper surface and configured to receive at least a portion of the cooling tube in the anode cooling channel; and
a cathode cooling channel formed in the cathode lower surface and configured to receive at least a portion of the cooling tube in the cathode cooling channel.

5. The assembly of claim 4,
wherein the inlet end is configured to receive the cooling fluid.

6. The assembly of claim 4,
wherein the anode cooling channel comprises an inlet end, an outlet end, and a plurality of passes therebetween forming a complementary profile to the cooling tube; and
wherein the cathode cooling channel comprises an inlet end, an outlet end, and a plurality of passes therebetween forming a complementary profile to the cooling tube.

7. The assembly of claim 4, further comprising a thermally-conductive coating disposed on at least one of the anode cooling channel or the cathode cooling channel.

8. The assembly of claim 1, further comprising a dielectric coating disposed between the cooling tube and each of the anode half-plate and the cathode half-plate.

9. A fuel cell assembly, comprising:
a first fuel cell comprising:
an anode and a cathode, the anode defining an anode upper surface and a plurality of anode outlets configured to pass anode exhaust gas therethrough;
wherein the anode upper surface defines an anode cooling channel therein;
a second fuel cell comprising:
a second anode and a second cathode, the second cathode defining a cathode lower surface;
wherein the cathode lower surface defines a cathode cooling channel therein; and
wherein the cathode lower surface is disposed on the anode upper surface; and
a cooling tube disposed in the anode cooling channel and the cathode cooling channel, the cooling tube defining an inlet end, an outlet end, and a plurality of passes forming a serpentine pattern therebetween, a first pass of the plurality of passes being coupled to the inlet end;
wherein the first pass is the most proximate pass to each of the plurality of anode outlets.

10. The fuel cell assembly of claim 9, further comprising a cooling system, the cooling system comprising:
a cooling supply line configured to supply a cooling fluid to the inlet end of the cooling tube; and
a cooling return line configured to receive the cooling fluid from the outlet end of the cooling tube;
wherein the cooling fluid comprises water or a two-phase mixture of water and steam at the inlet end of the cooling tube; and wherein the cooling fluid comprises steam or a two-phase mixture of water and steam at the outlet end of the cooling tube.

11. The fuel cell assembly of claim 10, wherein the cooling system further comprises:
a liquid-vapor separator, comprising:
a water supply line configured to supply water to the liquid-vapor separator; and
a vent configured to output steam from the liquid-vapor separator;
wherein the liquid-vapor separator is configured to supply water or the two-phase mixture to the cooling supply line; and
wherein the liquid-vapor separator is configured to receive steam or the two-phase mixture from the cooling return line.

12. The fuel cell assembly of claim 10, further comprising a dielectric coupling between the cooling tube and one of the cooling supply line or the cooling return line, the coupling comprising:
a core formed from a dielectric material;
a bore extending through the core and defining a first portion, a second portion, and a third portion disposed between the first portion and the second portion;
wherein the first portion is configured to receive one of the inlet end or the outlet end of the cooling tube; and
wherein the second portion is configured to receive one of the cooling supply line or the cooling return line.

13. The fuel cell assembly of claim 12, wherein the third portion is disposed between the cooling tube and the one of the cooling supply line or the cooling return line; and
wherein the third portion is configured to prevent the cooling tube from directly engaging the cooling supply line or the cooling return line.

14. The fuel cell assembly of claim 12, wherein a shell is disposed annularly about the core.

15. The fuel cell assembly of claim 14, wherein an epoxy filler is disposed between the shell and the core.

16. A method of cooling a fuel cell assembly, comprising:
providing an anode half-plate defining an anode cooling channel and a cathode half-plate defining a cathode cooling channel;
providing a cooling tube disposed in the anode cooling channel and the cathode cooling channel;
receiving a two-phase mixture of water and steam at an inlet end of the cooling tube;
transferring heat from at least one of the anode half-plate or the cathode half-plate to the water in the cooling tube;
vaporizing at least a portion of the water in the two-phase mixture into steam;
outputting at least one of the steam or the two-phase mixture from the cooling tube;
providing a liquid-vapor separator;
providing liquid water to the liquid-vapor separator; and
pressurizing the water in the liquid-vapor separator to form the two-phase mixture received at the cooling tube;
controlling pressure in the liquid-vapor separator with a backpressure release valve, wherein the backpressure release valve is configured to vent steam from the liquid-vapor separator; and
humidifying anode fuel with the vented steam.

17. The method of claim 16, wherein the anode half-plate is configured to transfer heat directly to the cooling tube through the anode cooling channel; and wherein the cathode half-plate is configured to transfer heat directly to the cooling tube through the cathode cooling channel.

18. The method of claim 16, further comprising feeding the two-phase mixture to the cooling tube proximate an anode exhaust stream.

* * * * *